United States Patent
Ohno

(10) Patent No.: US 12,263,806 B2
(45) Date of Patent: Apr. 1, 2025

(54) SEATBELT DEVICE

(71) Applicant: TOYOTA JIDOSHA KABUSHIKI KAISHA, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/378,686

(22) Filed: Oct. 11, 2023

(65) Prior Publication Data

US 2024/0140353 A1 May 2, 2024

(30) Foreign Application Priority Data

Oct. 31, 2022 (JP) .................. 2022-175008

(51) Int. Cl.
   *B60R 22/26* (2006.01)
   *B60Q 3/70* (2017.01)
   *B60R 22/18* (2006.01)
   *B60R 22/195* (2006.01)

(52) U.S. Cl.
   CPC ............ *B60R 22/26* (2013.01); *B60R 22/195* (2013.01); *B60Q 3/70* (2017.02); *B60R 2022/1806* (2013.01)

(58) Field of Classification Search
   CPC .................. B60R 22/26; B60R 22/195; B60R 2022/1806; B60Q 3/70
   See application file for complete search history.

(56) References Cited

U.S. PATENT DOCUMENTS

| | | | | |
|---|---|---|---|---|
| 4,961,251 A | * | 10/1990 | Smith | A44B 11/2576 24/633 |
| 9,376,089 B1 | * | 6/2016 | Bruderick | B60R 22/26 |
| 9,463,734 B2 | * | 10/2016 | Salter | A44B 11/2565 |
| 9,802,570 B1 | * | 10/2017 | Elton | B60R 22/20 |
| 2002/0089163 A1 | * | 7/2002 | Bedewi | B60R 22/02 280/808 |
| 2005/0134099 A1 | * | 6/2005 | Masutani | B60N 2/0732 297/468 |
| 2005/0241123 A1 | * | 11/2005 | Willard | A44B 11/2576 24/633 |

(Continued)

FOREIGN PATENT DOCUMENTS

| | | |
|---|---|---|
| DE | 3737366 A1 | 5/1989 |
| JP | 2017-039400 A | 2/2017 |

(Continued)

*Primary Examiner* — Paul N Dickson
*Assistant Examiner* — Shams Dhanani
(74) *Attorney, Agent, or Firm* — Dinsmore & Shohl LLP

(57) ABSTRACT

A seatbelt device, including: a seatbelt formed in a belt shape; a tongue plate through which the seatbelt has been inserted; a buckle that is provided at one side in a seat width direction of a vehicle seat, with the tongue plate being attachably and detachably anchored to the buckle; and a belt-end anchor section that is provided at another side in the seat width direction of the vehicle seat, and that includes a separation operation portion, with an end portion of the seatbelt being anchored to the belt-end anchor section and the end portion of the seatbelt becoming separable as a result of an occupant of the vehicle operating the separation operation portion during a vehicle emergency.

7 Claims, 14 Drawing Sheets

(56) References Cited

U.S. PATENT DOCUMENTS

| | | | | |
|---|---|---|---|---|
| 2006/0061176 A1* | 3/2006 | Sakai | B60R 22/26 | 297/344.15 |
| 2007/0126277 A1* | 6/2007 | Musale | B60N 2/43 | 297/464 |
| 2008/0238074 A1* | 10/2008 | Marriott | A44B 11/2576 | 280/801.1 |
| 2008/0290644 A1* | 11/2008 | Spahn | B60R 22/03 | 280/806 |
| 2012/0036687 A1* | 2/2012 | McGlynn | A44B 11/2576 | 24/633 |
| 2013/0099471 A1* | 4/2013 | Alvarado | A44C 5/2061 | 280/807 |
| 2014/0217804 A1* | 8/2014 | Maemura | B60R 22/26 | 297/474 |
| 2015/0014975 A1* | 1/2015 | Bahattab | B60R 22/32 | 280/801.1 |
| 2015/0145238 A1* | 5/2015 | Park | B60R 22/46 | 280/806 |
| 2016/0059778 A1* | 3/2016 | Ghannam | B60Q 3/242 | 297/217.6 |
| 2016/0159317 A1* | 6/2016 | Jung | A44B 11/2549 | 297/472 |
| 2016/0214554 A1* | 7/2016 | Shimazu | B60R 22/03 | |
| 2017/0267205 A1 | 9/2017 | Numazawa | | |
| 2019/0071051 A1* | 3/2019 | Board | B60R 21/18 | |
| 2019/0291685 A1* | 9/2019 | Ohno | B60R 22/023 | |
| 2019/0351867 A1* | 11/2019 | Storck | B60R 22/18 | |
| 2020/0079317 A1* | 3/2020 | Jaradi | B60R 22/1958 | |
| 2020/0247355 A1* | 8/2020 | Kuzumaki | B60R 21/013 | |
| 2021/0061220 A1* | 3/2021 | Yamamoto | B60R 21/01 | |
| 2021/0380067 A1* | 12/2021 | Hammadi | B60R 22/20 | |
| 2022/0063552 A1* | 3/2022 | Son | B60R 22/195 | |
| 2023/0036452 A1* | 2/2023 | Richards | B60R 22/023 | |
| 2023/0264649 A1* | 8/2023 | Vazquez | B60R 22/18 | 24/633 |
| 2024/0034268 A1* | 2/2024 | Cho | B60N 2/806 | |

FOREIGN PATENT DOCUMENTS

| | | |
|---|---|---|
| JP | 2017-170941 A | 9/2017 |
| WO | 2004/101331 A1 | 11/2004 |

* cited by examiner

SEATBELT DEVICE

CROSS-REFERENCE TO RELATED APPLICATION

This application is based on and claims priority under 35 USC 119 from Japanese Patent Application No. 2022-175008 filed on Oct. 31, 2022, the disclosure of which is incorporated by reference herein.

BACKGROUND

Technical Field

The present disclosure relates to a seatbelt device.

Related Art

A vehicle disclosed in Japanese Patent Application Laid-Open (JP-A) No. 2017-039400 is capable of switching between a state in which a seat such as a driving seat facing toward a front side of the vehicle and a state facing toward a rear side of the vehicle by rotating the seat such as a driving seat in vehicle plan view.

However, when a seat, which is installed with a seatbelt device including a seatbelt that is worn across a seated occupant, a tongue plate that the seatbelt is inserted through, and a buckle that the tongue plate engages with, is rotated in vehicle plan view, conceivably the buckle becomes disposed at a side door side of a vehicle. In such cases, the side door might be displaced toward a vehicle cabin inside when the vehicle is involved in a side impact, and a clearance between the buckle and the side door might conceivably become small. As a result thereof, operation of the buckle might become difficult, making is difficult to remove the seatbelt.

SUMMARY

In consideration of the above circumstances, the present disclosure provides a seatbelt device capable of suppressing removal of a seatbelt from becoming difficult during a vehicle emergency, such as a side impact or the like.

A seatbelt device of a first aspect includes a seatbelt formed in a belt shape, a tongue plate through which the seatbelt has been inserted, a buckle that is provided at one side in a seat width direction of a vehicle seat, with the tongue plate being attachably and detachably anchored to the buckle, and a belt-end anchor section that is provided at another side in the seat width direction of the vehicle seat, and that includes a separation operation portion, with an end portion of the seatbelt being anchored to the belt-end anchor section and the end portion of the seatbelt becoming separable as a result of an occupant of the vehicle operating the separation operation portion during a vehicle emergency.

In the seatbelt device of the first aspect, the occupant seated in the vehicle seat wears the seatbelt by the occupant anchoring the tongue plate in the buckle. The occupant seated in the vehicle seat is accordingly able to operate the separation operation portion of the belt-end anchor section in cases in which it is difficult for the occupant to operate the buckle and separate the tongue plate from the buckle during a vehicle emergency, such as a side impact or the like. The end portion of the seatbelt separates from the belt-end anchor section when occupant seated in the vehicle seat operates the separation operation portion of the belt-end anchor section. This thereby enables the occupant seated in the vehicle seat to remove the seatbelt.

A seatbelt device of a second aspect is the seatbelt device of the first aspect, further including a pre-tensioner section configured to remove slack from the seatbelt by pulling the belt-end anchor section during a vehicle emergency, wherein the belt-end anchor section is disposed with the separation operation portion at a position inoperable by the occupant of the vehicle in a state prior to actuation of the pre-tensioner section, and the belt-end anchor section is disposed with the separation operation portion at a position operable by the occupant of the vehicle in a state after actuation of the pre-tensioner section.

In the seatbelt device of the second aspect, the occupant of the vehicle is unable to operate the separation operation portion in a state prior to actuation of the pre-tensioner section. When the pre-tensioner section is actuated, the belt-end anchor section is pulled, and slack in the seatbelt is removed. When the pre-tensioner section is actuated, the belt-end anchor section is disposed in a position where the separation operation portion is operable by the occupant of the vehicle. The occupant seated in the vehicle seat is then able to operate the separation operation portion of the belt-end anchor section in cases in which it is difficult for the occupant to operate the buckle and separate the tongue plate from the buckle. The end portion of the seatbelt separates from the belt-end anchor section when the occupant seated in the vehicle seat operates the separation operation portion of the belt-end anchor section. This thereby enables the occupant seated in the vehicle seat to remove the seatbelt.

A seatbelt device of a third aspect is the seatbelt device of the second aspect, further including a cover member that partitions a belt-end anchor section side from a side of the occupant seated in the vehicle seat and that includes an opening formed in a portion of the cover member, wherein the separation operation portion is covered by the cover member in a state prior to actuation of the pre-tensioner section, and the separation operation portion is disposed at a position overlapping with the opening in a state after actuation of the pre-tensioner section.

In the seatbelt device of the third aspect, the separation operation portion is covered by the cover member in a state prior to actuation of the pre-tensioner section. This thereby the occupant of the vehicle is unable to operate the separation operation portion. The separation operation portion is disposed at a position overlapping with the opening in the state after actuation of the pre-tensioner section. The occupant seated in the vehicle seat is then able to operate the separation operation portion of the belt-end anchor section through the opening formed in the cover member in cases in which it is difficult for the occupant to operate the buckle and separate the tongue plate from the buckle. The end portion of the seatbelt separates from the belt-end anchor section when the occupant seated in the vehicle seat operates the separation operation portion of the belt-end anchor section through the opening formed in the cover member. This thereby enables the occupant seated in the vehicle seat to remove the seatbelt.

The seatbelt device of the fourth aspect is the seatbelt device of the first aspect, wherein the belt-end anchor section includes a belt-end anchor section body and the separation operation portion, which is supported by the belt-end anchor section body, the belt-end anchor section body and the separation operation portion are configured with an identical color or common color series as each other in a normal state of the vehicle, and at least a portion of the separation operation portion is illuminated during a vehicle emergency.

In the seatbelt device of the fourth aspect, the belt-end anchor section body and the separation operation portion are configured with the identical color or common color series as each other in a normal state of the vehicle. This accordingly enables the portion of the belt-end anchor section corresponding to the separation operation portion to be made so as not to stand out in a normal state of the vehicle. In contrast thereto, at least a portion of the separation operation portion is illuminated during a vehicle emergency. The portion of the belt-end anchor section corresponding to the separation operation portion can accordingly be made to stand out during a vehicle emergency.

A seatbelt device of a fifth aspect is the seatbelt device of the first aspect, wherein a buckle-side separation operation portion is provided at the buckle and enables separation of the tongue plate as a result of the buckle-side separation operation portion being operated by the occupant of the vehicle, and an operation load on the separation operation portion needed to enable the end portion of the seatbelt to separate from the belt-end anchor section is higher than an operation load on the buckle-side separation operation portion needed to enable the tongue plate to separate from the buckle.

In the seatbelt device of the fifth aspect, the operation load on the separation operation portion needed to enable the end portion of the seatbelt to separate from the belt-end anchor section is higher than the operation load on the buckle-side separation operation portion needed to enable the tongue plate to separate from the buckle. This accordingly enables the end portion of the seatbelt to be made irremovable from the belt-end anchor section even when the separation operation portion has been operated with a similar operation load to that of the buckle-side separation operation portion.

A seatbelt device of a sixth aspect is the seatbelt device of the first aspect, wherein the belt-end anchor section includes a belt-end anchor section body and the separation operation portion, which is supported by the belt-end anchor section body, the buckle includes a buckle body and a buckle-side separation operation portion that is supported by the buckle body, with the tongue plate being made separable from the buckle as a result of an occupant of the vehicle operating the buckle-side separation operation portion, and a position of the separation operation portion with respect to the belt-end anchor section body is deeper inside the belt-end anchor section body than a position of the buckle-side separation operation portion with respect to the buckle body.

In the seatbelt device of the sixth aspect, the position of the separation operation portion with respect to the belt-end anchor section body is deeper inside the belt-end anchor section body than the position of the buckle-side separation operation portion with respect to the buckle body. This thereby enables the occupant of the vehicle to be suppressed from operating the separation operation portion of the belt-end anchor section by mistaking it for the buckle.

A seatbelt device of a seventh aspect includes a seatbelt formed in a belt shape, a tongue plate through which the seatbelt has been inserted, a buckle that is provided at one side in a seat width direction of a vehicle seat, with the tongue plate being attachably and detachably anchored to the buckle, and an operation space forming member that is provided at the one side in the seat width direction of the vehicle seat and at a seat width direction outer side with respect to the buckle, and that, when pressed toward the buckle side, displaces toward another side in the seat width direction together with the buckle in a state in which a space configured to enable operation of the buckle has been secured, the space being formed between the operation space forming member and the buckle.

In the seatbelt device of the seventh aspect, the occupant seated in the vehicle seat wears the seatbelt by the occupant anchoring the tongue plate in the buckle. When the operation space forming member is pressed toward the buckle side during a vehicle emergency, such as a side impact or the like, the operation space forming member is displaced toward the seat width direction the other side together with the buckle in a state in which the space configured to enable operation of the buckle has been secured, the space is formed between the operation space forming member and the buckle. This thereby enables the occupant seated in the vehicle seat to operate the buckle and separate the tongue plate from the buckle even during a vehicle emergency. This occupant seated in the vehicle seat is thereby able to remove the seatbelt.

A seatbelt device of an eighth aspect is the seatbelt device of the seventh aspect, wherein a deforming member is provided at a seat width direction outer side of the vehicle seat with respect to the operation space forming member, with the deforming member deforming toward an opposite side from the operation space forming member in conjunction with the operation space forming member being pressed toward the buckle side.

Is the seatbelt device of the eighth aspect, the deforming member is provided at the seat width direction outer side of the vehicle seat with respect to the operation space forming member. The deforming member deforms toward the opposite side from the operation space forming member in conjunction with the operation space forming member being pressed toward the buckle side. This thereby enables displacement of the operation space forming member toward the buckle side to be suppressed by an amount commensurate with the amount of deformation of the deforming member.

The seatbelt device according to the present disclosure exhibits the effect of enabling a seatbelt to be suppressed from becoming difficult to remove during a vehicle emergency, such as a side impact or the like.

BRIEF DESCRIPTION OF THE DRAWINGS

Exemplary embodiments of the present disclosure will be described in detail based on the following figures, wherein.

DETAILED DESCRIPTION

First Exemplary Embodiment Seatbelt Device 10

Explanation follows regarding a seatbelt device 10 according to a first exemplary embodiment of the present disclosure, with reference to FIG. 1 to FIG. 5.

Figure 1:
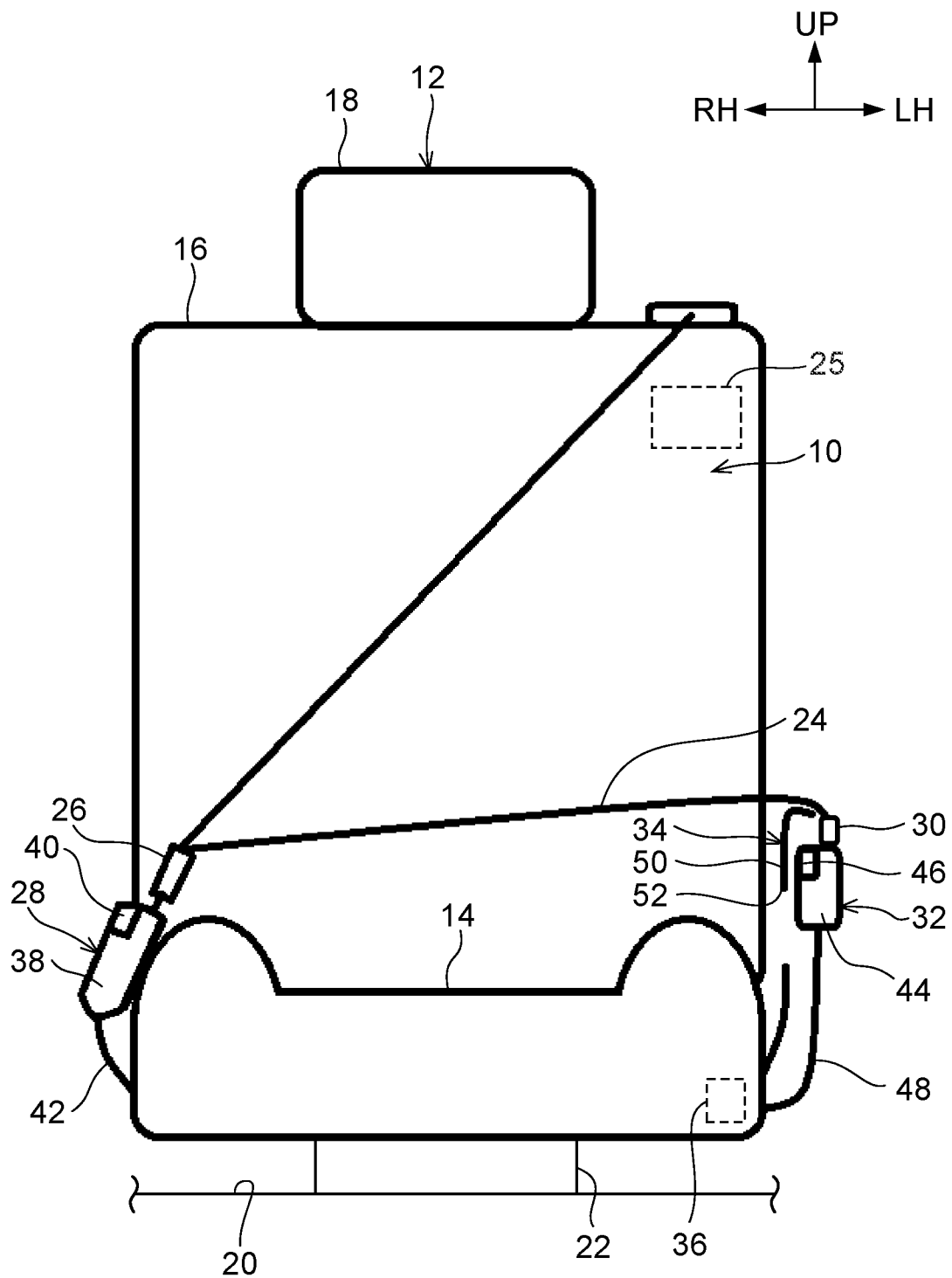
FIG. 1 is a face-on view schematically illustrating a vehicle seat provided with a seatbelt device of a first exemplary embodiment, illustrated in a state prior to actuation of a pre-tensioner section.

As illustrated in FIG. 1, the seatbelt device 10 of the present exemplary embodiment is provided to a seat 12 of a vehicle. The vehicle provided with the seat 12 is, as an example, an autonomous driving vehicle capable of traveling without driving operation by an occupant. The seat 12 includes a seat cushion 14 that supports the buttocks of a seated occupant from a seat lower side, a seatback 16 that supports the back of the seated occupant from a seat rear side, and a headrest 18 that supports the head of the seated occupant from the seat rear side. Note that a seat front side, a seat rear side, a seat left side, and a seat right side respectively indicate a seat front side, rear side, right side, and left side as viewed from the occupant seated in the seat 12. The directions toward the seat left side and the seat right side are each aligned with the seat width direction. In the following description, unless explicitly stated otherwise, use of simply front-rear, up-down, and left-right directions indicate the front-rear in the seat front-rear direction, up-down in the seat up-down direction, and left-right in the seat left-right direction.

A rotation support section 22 is provided between the seat 12 and a floor 20 of the vehicle to support the seat 12 so as to be rotatable about an axial direction along the up-down direction. Due to providing the rotation support section 22, the seat 12 is able to be rotated between a state facing toward the front side and a state facing toward the rear side. A lock mechanism for locking rotation of the seat 12 is provided in the rotation support section 22. This means that the seat 12 is able to be maintained in each state from out of the state facing toward the front side and the state facing toward the rear side.

The seatbelt device 10 of the present exemplary embodiment is a so-called three-point seatbelt device. The seatbelt device 10 includes a seatbelt (webbing) 24 formed in a belt shape, a retractor 25 for winding the seatbelt 24 onto, a tongue plate 26 through which the seatbelt 24 is inserted, and a buckle 28 for the tongue plate 26 to engage with. The seatbelt device 10 also includes an anchor member 30 where an end portion of the seatbelt 24 at the opposite side to the side taken up on the retractor 25 is fixed, a belt-end anchor section 32 that the anchor member 30 is anchored to, and a cover member 34 that covers the belt-end anchor section 32. Furthermore, the seatbelt device 10 includes a pre-tensioner section 36 to remove slack from the seatbelt 24 during a vehicle emergency.

Configuration is such that one side of the seatbelt 24 is taken up on the retractor 25 fixed to the inside of the seatback 16. The anchor member 30 is fixed to an end portion on another side of the seatbelt 24.

The buckle 28 includes a buckle body 38, and a buckle-side button 40 that is supported by the buckle body 38 and also serves as a buckle-side separation operation portion for operation by an occupant of the vehicle. The buckle body 38 is fixed to an end portion on a seat width direction one-side (right side in the present exemplary embodiment) of the seat cushion 14 via a connection member 42. Configuration is such that a portion of the tongue plate 26 is anchored to the buckle body 38 in a state inserted therein. The tongue plate 26 is able to be released from the buckle body 38 by pressing the buckle-side button 40 toward a lower side with respect to the buckle body 38. Namely, the tongue plate 26 is attachably and detachably anchored to the buckle 28.

The basic configuration of the belt-end anchor section 32 is a configuration similar to that of the buckle 28. The belt-end anchor section 32 includes a belt-end anchor section body 44, and an emergency button 46 serving as a separation operation portion that is supported by the belt-end anchor section body 44. The belt-end anchor section body 44 is fixed to an end portion on the seat width direction another-side (left side in the present exemplary embodiment) of the seat cushion 14 through a connection member 48. The anchor member 30 is configured so as to be anchored to the belt-end anchor section body 44 in a state inserted therein. The anchor member 30 is able to be released from the belt-end anchor section body 44 by pressing the emergency button 46 toward a lower side with respect to the belt-end anchor section body 44.

The connection member 48 is connected to the pre-tensioner section 36. The connection member 48 is configured so as to be pulled toward the lower side by actuation of the pre-tensioner section 36. The belt-end anchor section 32 that is connected to the connection member 48 is thereby pulled toward the lower side such that slack in the seatbelt 24 is removed.

Figure 2:
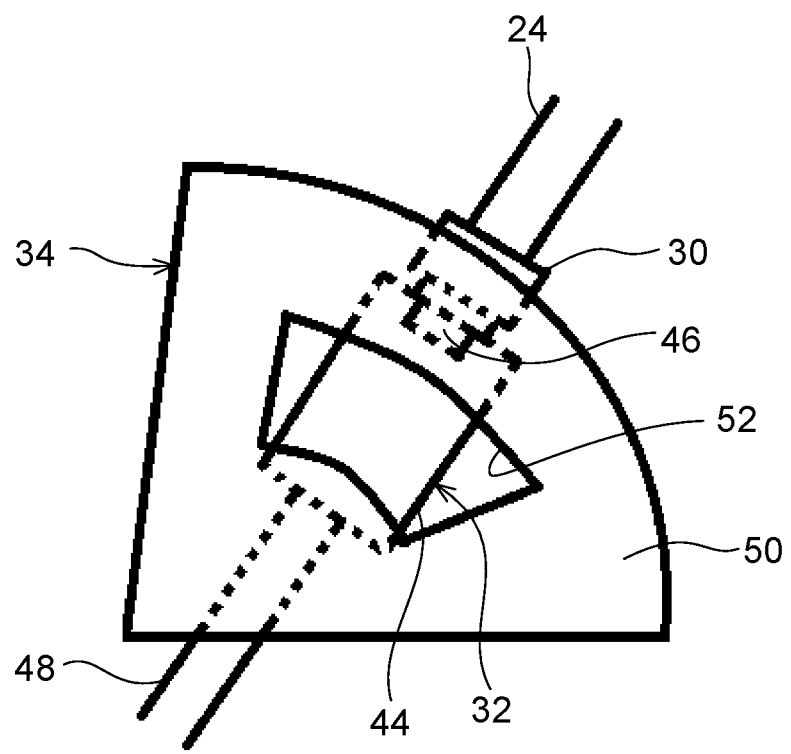
FIG. 2 is a schematic diagram of a cover member as viewed from a seat width direction inside, illustrated in a state prior to actuation of a pre-tensioner section.

The cover member 34 is formed in a plate shape, and is fixed to an end portion on the seat width direction another-side of the seat cushion 14 (the left side in the present exemplary embodiment) in a state in which most of the cover member 34 is disposed between the seat cushion 14 and the belt-end anchor section 32. The cover member 34 is thereby configured so as to partition a belt-end anchor section 32 side from side of the occupant seated in the seat 12 of the vehicle. As illustrated in FIG. 2, the cover member 34 includes a fan plate portion 50 configured with a fan shape when viewed from the seat width direction inside (the side of the occupant seated in the seat 12). A rectangular shaped opening 52 is formed in an up-down direction and front-rear direction central portion of the fan plate portion 50. In a state prior to actuation of the pre-tensioner section 36, the belt-end anchor section body 44 of the belt-end anchor section 32 is disposed at a position overlapping in the seat width direction with the opening 52, and also the emergency button 46 of the belt-end anchor section 32 is covered by the cover member 34. Thus the belt-end anchor section 32 is disposed with the emergency button 46 at a position inoperable by the occupant of the vehicle in a state prior to actuation of the pre-tensioner section 36.

Operation and Effects of Present Exemplary Embodiment

Next, description follows regarding the operation and effects of the present exemplary embodiment.

As illustrated in FIG. 1, the seatbelt 24 is worn by the occupant seated in the seat 12 by the occupant anchoring the tongue plate 26 in the buckle body 38 of the buckle 28.

As illustrated in FIG. 2, in a normal state of the vehicle, the belt-end anchor section body 44 of the belt-end anchor section 32 is disposed at a position overlapping in the seat width direction with the opening 52 of the cover member 34, and also the emergency button 46 of the belt-end anchor section 32 is covered by the cover member 34. The occupant seated in the seat 12 is accordingly suppressed from pressing the emergency button 46 of the belt-end anchor section 32 accidentally in a normal state of the vehicle. Note that reference to being in a normal state of the vehicle means a state in which the vehicle is traveling or a state in which the vehicle is stationary, and is a state in which abnormal acceleration due to a collision of the vehicle or the like is not acting.

Figure 3:
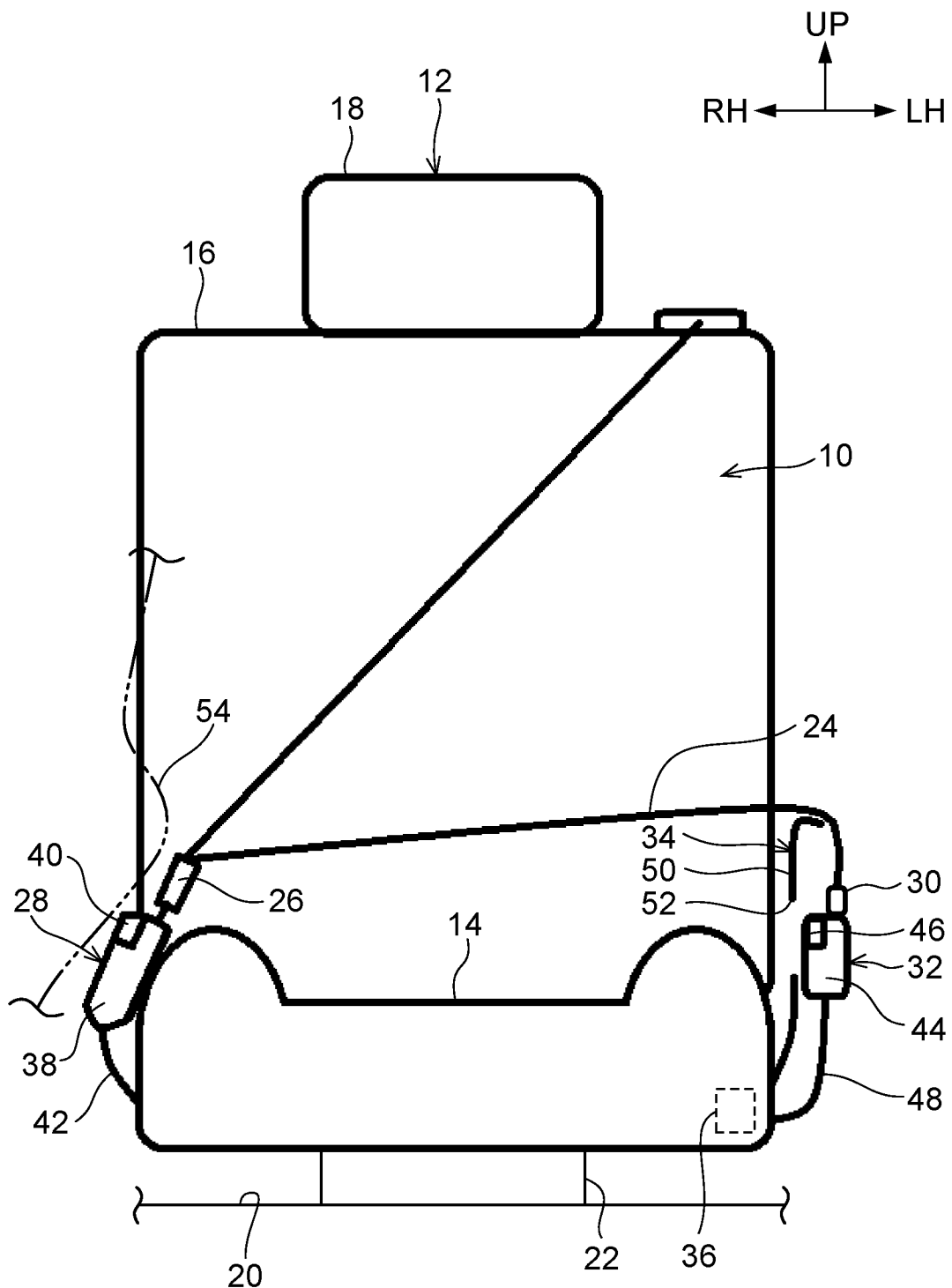
FIG. 3 is a face-on view schematically illustrating a vehicle seat provided with a seatbelt device of a first exemplary embodiment, illustrated in a state after actuation of a pre-tensioner section.
Figure 4:
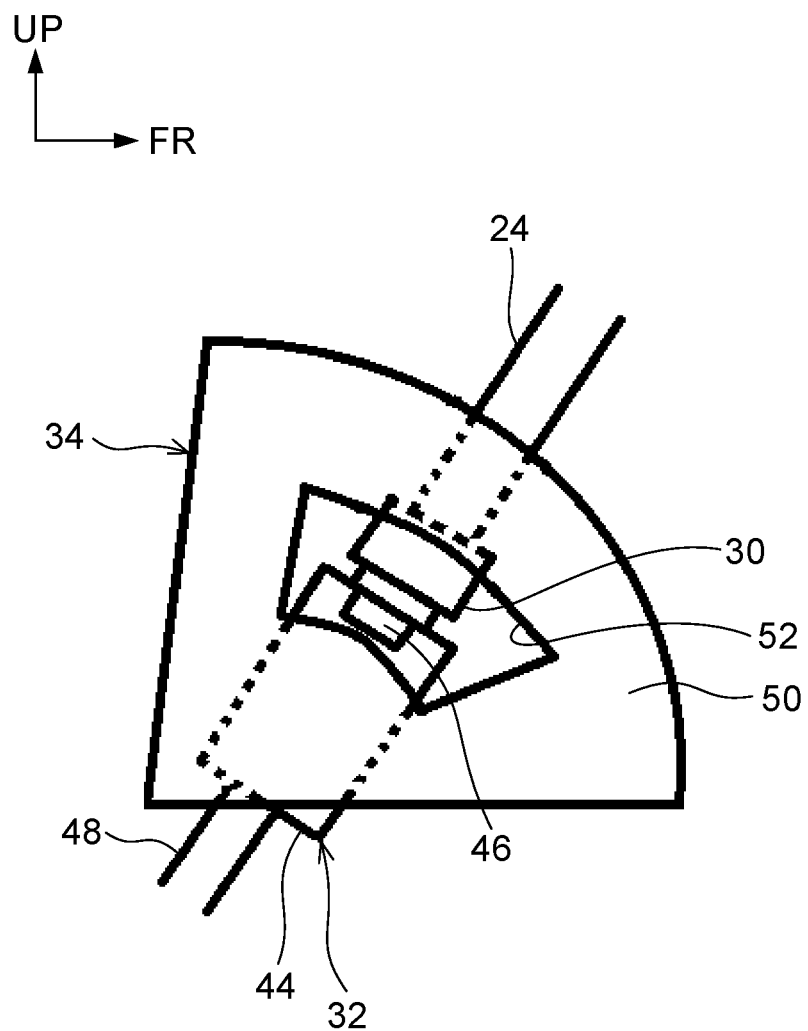
FIG. 4 is a schematic diagram of a cover member as viewed from a seat width direction inside, in a state after actuation of a pre-tensioner section.

Moreover, the pre-tensioner section 36 is actuated as illustrated in FIG. 3 and FIG. 4 during a vehicle emergency such as when the vehicle has incurred a side impact. The connection member 48 is pulled downward when the pre-tensioner section 36 is actuated, and the belt-end anchor section 32 connected to the connection member 48 is also pulled downward. Slack in the seatbelt 24 is thereby removed, and a restraint force by the seatbelt 24 on the occupant seated in the seat 12 is raised. Moreover, when the belt-end anchor section 32 is pulled downward in conjunction with actuation of the pre-tensioner section 36, the emergency button 46 of the belt-end anchor section 32 becomes disposed at a position overlapping in the seat width direction with the opening 52 of the cover member 34. Thus the belt-end anchor section 32 is disposed with the emergency button 46 at a position operable by the occupant of the vehicle in a state after actuation of the pre-tensioner section 36.

Figure 5:
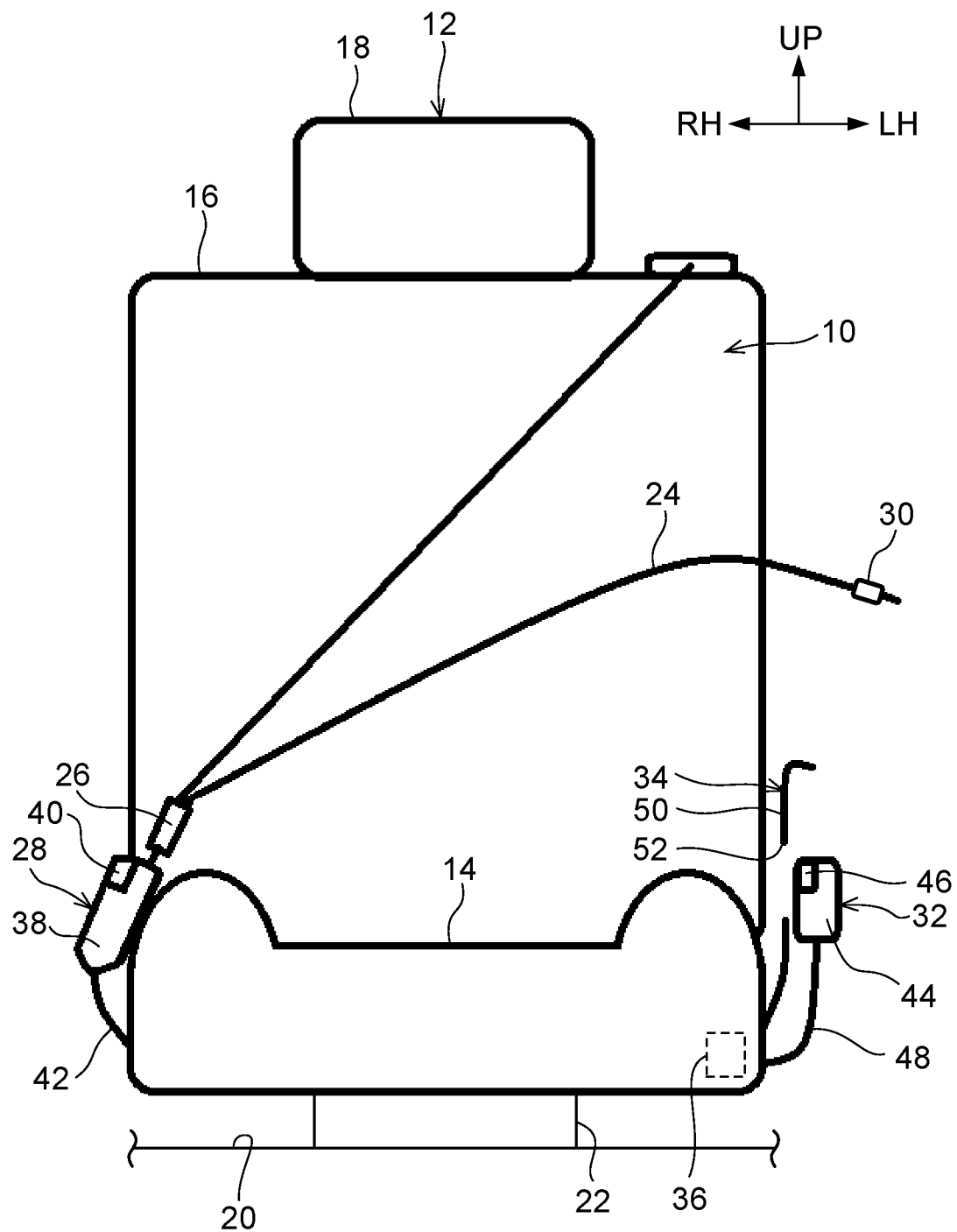
FIG. 5 is a face-on view schematically illustrating a vehicle seat provided with a seatbelt device of the first exemplary embodiment, illustrated in a state in which an end portion of a seatbelt has been removed from a belt-end anchor section.

In a vehicle in which the seat 12 is able to be rotated with the up-down direction as the axial direction, sometimes the buckle 28 is disposed alongside a side door 54 when the seat 12 has been faced toward the rear side. In such cases the side door 54 may be displaced toward the buckle 28 side during a side impact of the vehicle or the like, as illustrated by the double-dot broken lines in FIG. 3, and a space to operate the buckle-side button 40 of the buckle 28 may become narrow. As a result thereof, the occupant seated in the seat 12 might conceivably find it difficult to press the buckle-side button 40 of the buckle 28 and to separate the tongue plate 26 from the buckle body 38. The occupant is, however, able to operate the emergency button 46 of the belt-end anchor section 32 through the opening 52 of the cover member 34 in such cases. The anchor member 30 separates from the belt-end anchor section body 44 when the occupant seated in the seat 12 has operated the emergency button 46 of the belt-end anchor section 32, as illustrated in FIG. 5. Namely, the another-side end portion of the seatbelt 24 separates from the belt-end anchor section 32. The occupant seated in the seat 12 is accordingly able to remove the seatbelt 24. The seatbelt device 10 of the present exemplary embodiment is accordingly able to suppress the seatbelt 24 from becoming difficult to remove during a vehicle emergency, such as a side impact.

Second Exemplary Embodiment and Third Exemplary Embodiment Seatbelt Devices 56, 58

Figure 6:
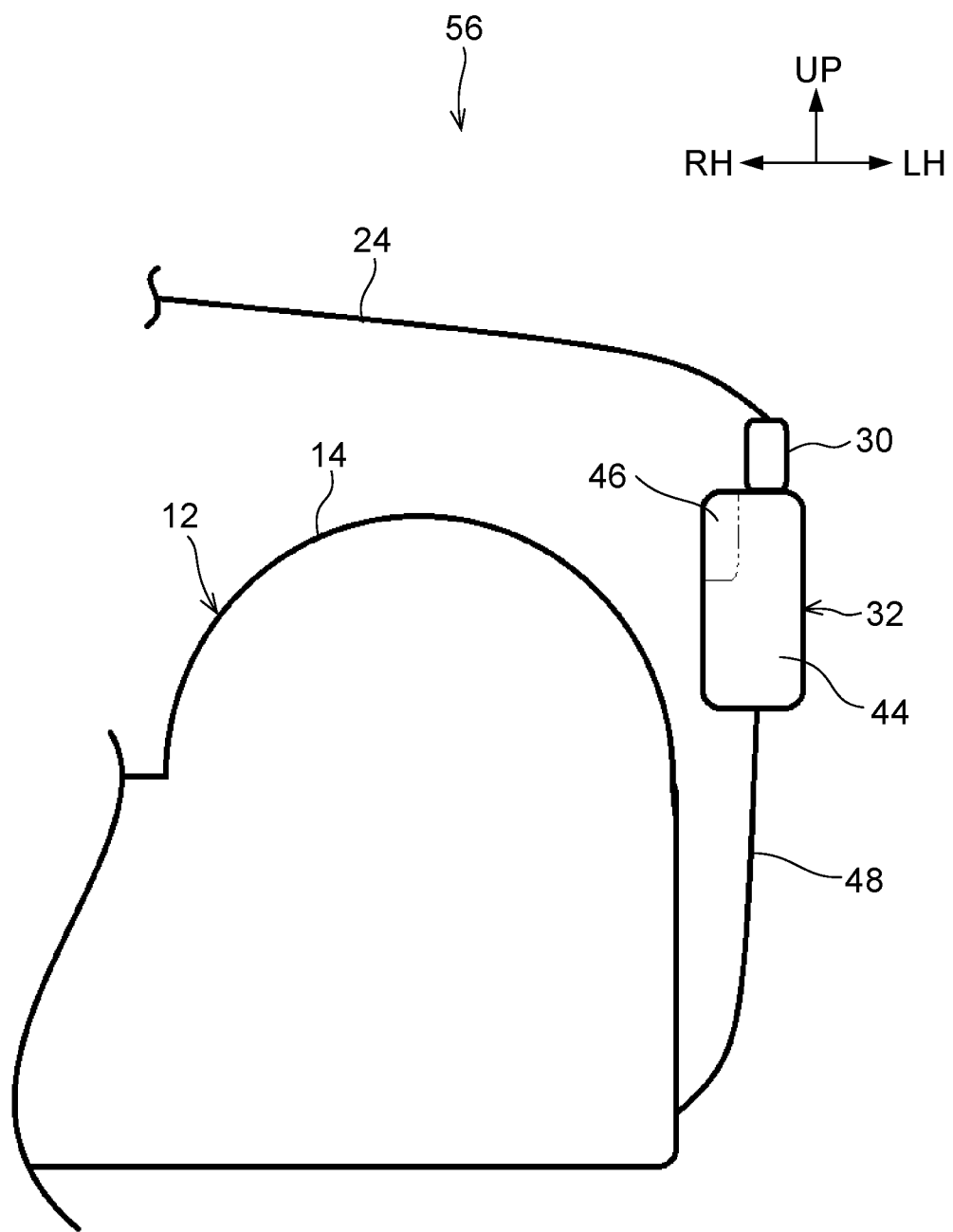
FIG. 6 is an enlarged face-on view illustrating an enlargement of a vicinity of a belt-end anchor section of a seatbelt device of a second exemplary embodiment, illustrated in a state prior to illumination of a separation operation portion.
Figure 7:
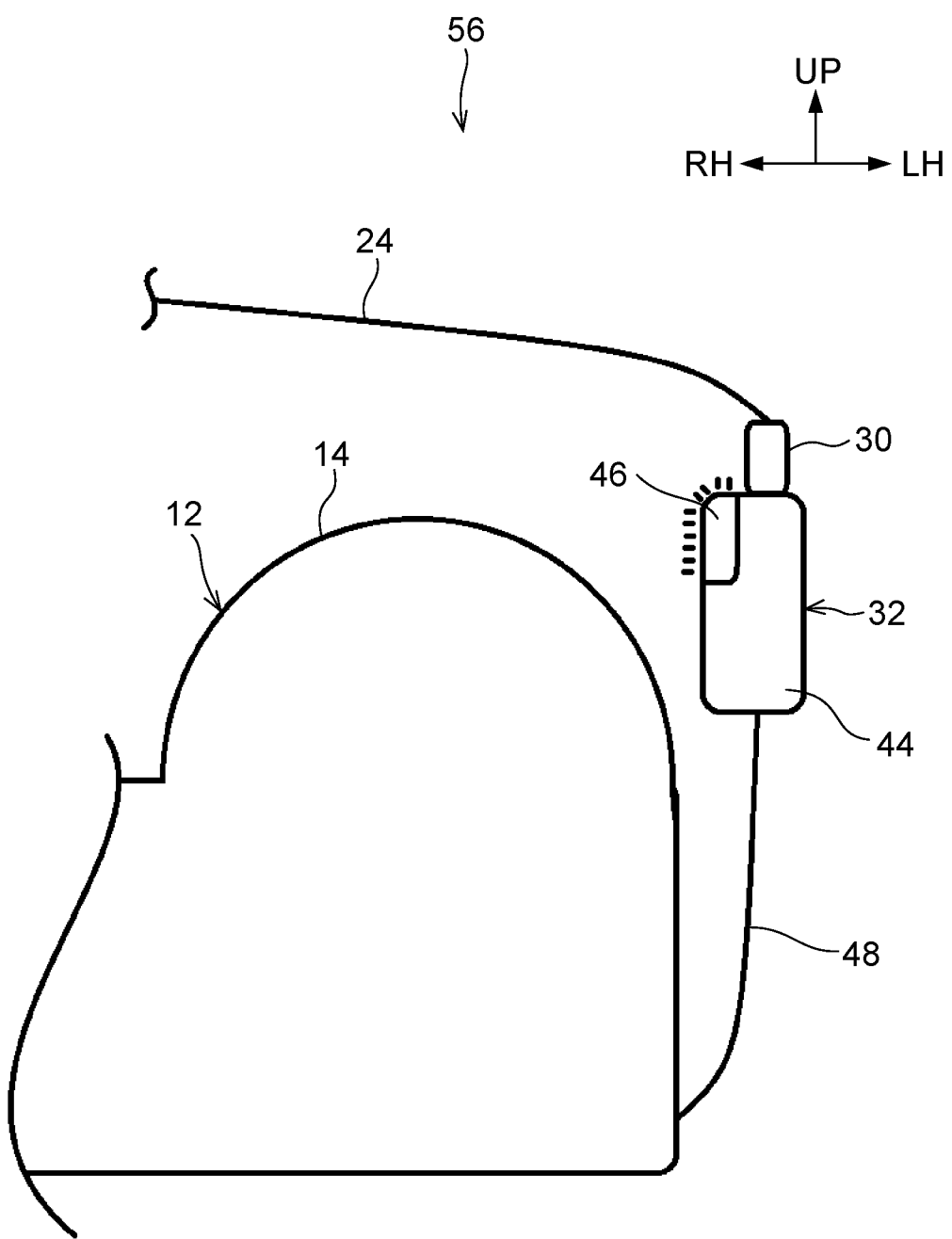
FIG. 7 is an enlarged face-on view illustrating an enlargement of a vicinity of a belt-end anchor section of a seatbelt device of the second exemplary embodiment, illustrated in a state in which a separation operation portion has been illuminated.
Figure 8:
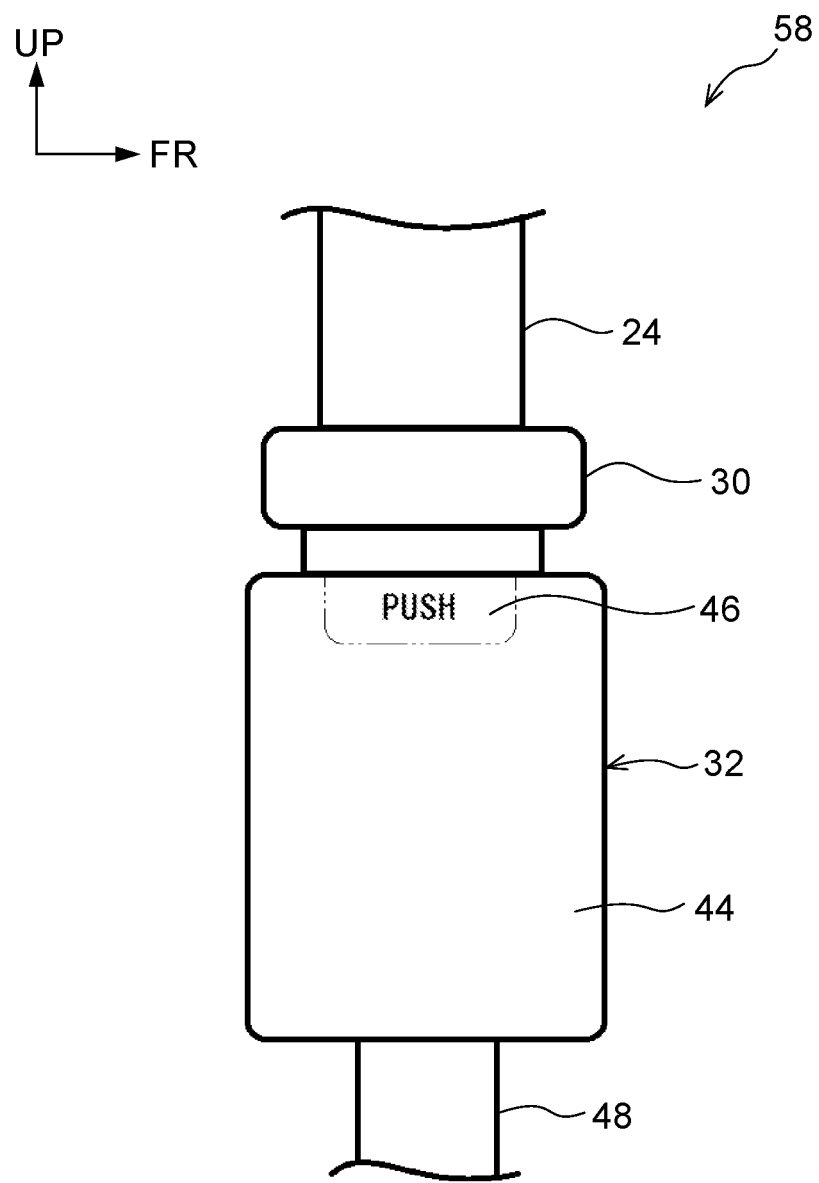
FIG. 8 is an enlarged side view illustrating an enlargement of a vicinity of a belt-end anchor section of a seatbelt device of a third exemplary embodiment, illustrated in a state in which a separation operation portion has been illuminated.

Next, description follows regarding the seatbelt devices 56, 58 according to the second exemplary embodiment and the third exemplary embodiment, with reference to FIG. 6 to FIG. 8. Note that in the seatbelt devices 56, 58 according to the second exemplary embodiment and the third exemplary embodiment, members and portions corresponding to those of the seatbelt device 10 of the first exemplary embodiment will be appended with the same reference numerals as such corresponding members and portions of the seatbelt device 10 of the first exemplary embodiment, and explanation thereof will be omitted.

As illustrated in FIG. 6, in the seatbelt device 56 of the second exemplary embodiment, a portion of the belt-end anchor section body 44 visible to the occupant and a portion of the emergency button 46 visible to the occupant are formed using materials having an identical color or in common color series as each other. Note that reference here to common color series means colors having a similar hue. For example, black and grey are in common color series as each other, and orange and red are also in common color series as each other. The emergency button 46 is also formed using a material able to transmit light. Furthermore, a light source is provided at the inside of the emergency button 46.

In the seatbelt device 56 of the second exemplary embodiment as described above, the portions of the belt-end anchor section body 44 visible to the occupant and the portions of the emergency button 46 visible to the occupant are an identical color or common color series as each other in a normal state of the vehicle. This thereby enables portions corresponding to the emergency button 46 in the belt-end anchor section 32 to be made so as to not stand out in a normal state of the vehicle. In contrast thereto, as illustrated in FIG. 7, the light source provided inside the emergency button 46 emits light during a vehicle emergency. The light from the light source is accordingly transmitted through the emergency button 46 and the emergency button 46 emits light. In other words, the emergency button 46 is illuminated. As an example, the emergency button 46 emits red or orange light. In this manner, in the seatbelt devices 56 of the second exemplary embodiment, the portions corresponding to the emergency button 46 of the belt-end anchor section 32 can be made to stand out during a vehicle emergency.

As illustrated in FIG. 8, the seatbelt device 58 of the third exemplary embodiment is configured similarly to the seatbelt device 56 of the second exemplary embodiment, except for the emergency button 46 emitting light such that the word "PUSH" stands out. In the seatbelt device 58 of the third exemplary embodiment too, the portions corresponding to the emergency button 46 in the belt-end anchor section 32 can be configured so as not to stand out in a normal state of the vehicle. Moreover, the portions corresponding to the emergency button 46 of the belt-end anchor section 32 can be made to stand out during a vehicle emergency. Furthermore, the operation method of the emergency button 46 can be transmitted to the occupant through the word "PUSH".

Fourth Exemplary Embodiment and Fifth Exemplary Embodiment Seatbelt Devices 60, 62

Figure 9:
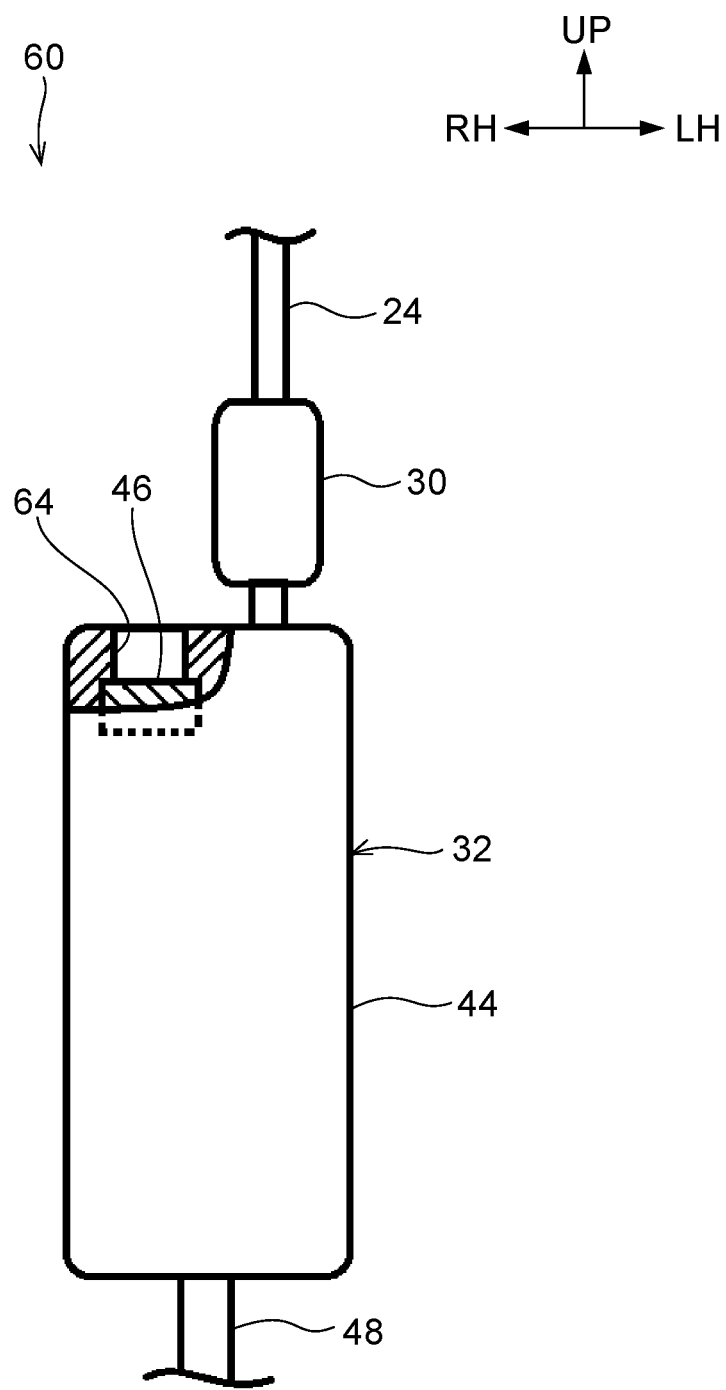
FIG. 9 is an enlarged face-on view illustrating an enlargement of a belt-end anchor section and a seatbelt end portion of a seatbelt device of a fourth exemplary embodiment, illustrated in cross-section of only a vicinity of a separation operation portion.
Figure 10:
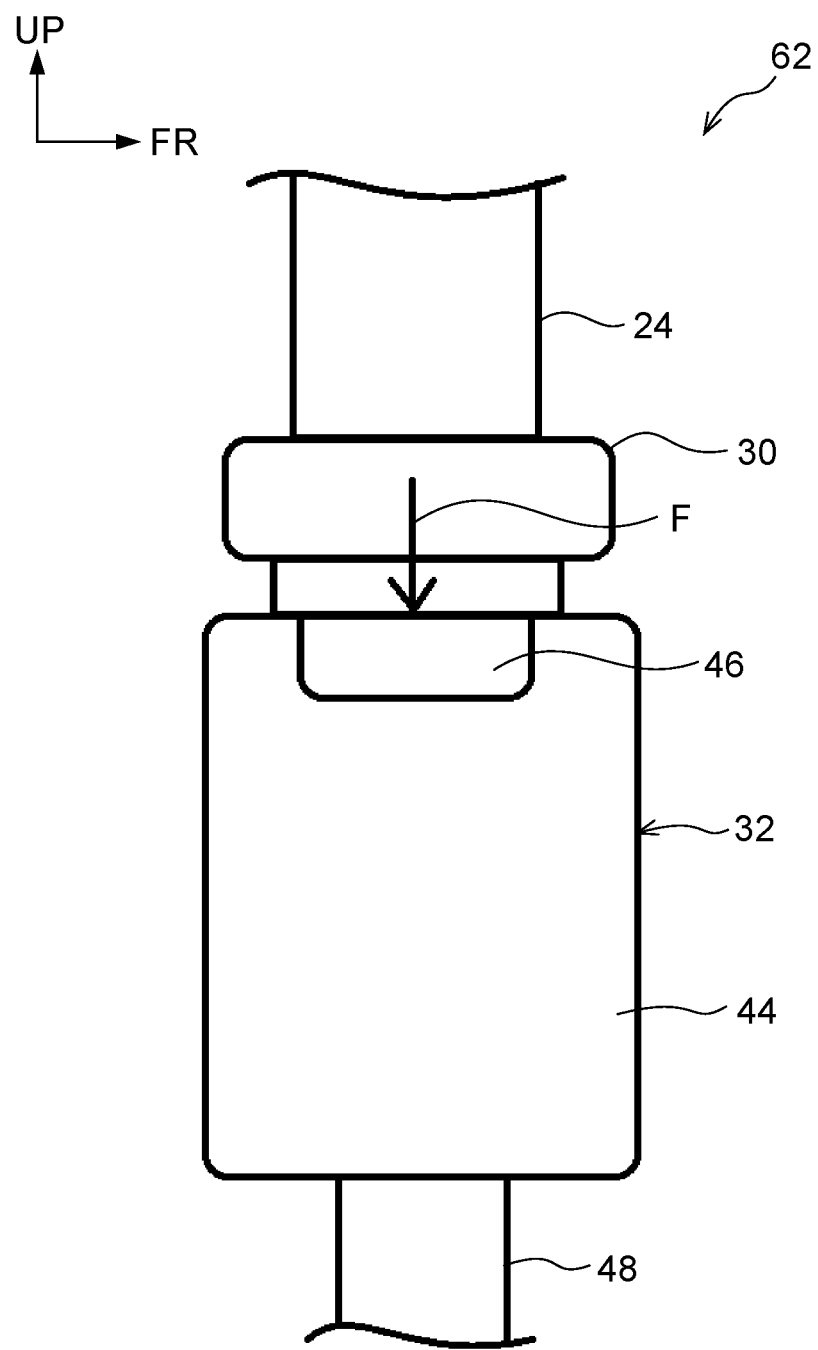
FIG. 10 is an enlarged side view illustrating an enlargement of a belt-end anchor section and seatbelt end portion of a seatbelt device of a fifth exemplary embodiment.

Next, description follows regarding seatbelt devices 60, 62 according to a fourth exemplary embodiment and a fifth exemplary embodiment, with reference to FIG. 9 and FIG. 10. Note that in the seatbelt devices 60, 62 according to the fourth exemplary embodiment and the fifth exemplary embodiment, members and portions corresponding to those of the seatbelt device 10 of the first exemplary embodiment will be appended with the same reference numerals as such corresponding members and portions of the seatbelt device 10 of the first exemplary embodiment, and explanation thereof will be omitted.

As illustrated in FIG. 9, in the seatbelt device 60 of the fourth exemplary embodiment, a position of the emergency button 46 with respect to the belt-end anchor section body 44 is deeper inside the belt-end anchor section body 44 than a position of the buckle-side button 40 with respect to the buckle body 38 (see FIG. 1). As illustrated in FIG. 1, a portion of the buckle-side button 40 to be pressed by the occupant is exposed outside the buckle body 38. In contrast thereto, as illustrated in FIG. 9, a portion of the emergency button 46 to be pressed by the occupant is positioned inside the belt-end anchor section body 44. An operation hole 64 is formed so as to pierce the belt-end anchor section body 44 in the up-down direction. The emergency button 46 is disposed at a lower side of the operation hole 64.

In the seatbelt device 60 of the fourth exemplary embodiment as described above, the emergency button 46 is not able to be pressed unless a finger is inserted into the operation hole 64 formed in the belt-end anchor section body 44. This thereby enables the occupant to be suppressed from operating the emergency button 46 of the belt-end anchor section 32 by mistaking it for the buckle 28.

As illustrated in FIG. 10, in the seatbelt device 62 of the fifth exemplary embodiment, an operation load F on the emergency button 46 needed to enable the anchor member 30 to separate from the belt-end anchor section body 44 is set to a higher operation load than the operation load on the buckle-side button 40 (see FIG. 1) needed to enable the tongue plate 26 to separate from the buckle body 38. In the seatbelt device 62 of the fifth exemplary embodiment, as an example, an operation load F on the emergency button 46 needed to enable the anchor member 30 to separate from the belt-end anchor section body 44 is set to an operation load that is twice the operation load on the buckle-side button 40 (see FIG. 1) needed to enable the tongue plate 26 to separate from the buckle body 38.

In the seatbelt device 62 of the fifth exemplary embodiment, the operation load F on the emergency button 46 needed to enable the anchor member 30 to separate from the belt-end anchor section body 44 is set as described above. The anchor member 30 can accordingly be rendered so as to not be removed from the belt-end anchor section body 44 even if the emergency button 46 is operated with a similar operation load to that of the buckle-side button 40.

Sixth Exemplary Embodiment and Seventh Exemplary Embodiment Seatbelt Devices 66, 68

Next description follows regarding seatbelt devices 66, 68 according to a sixth exemplary embodiment and a seventh exemplary embodiment, with reference to FIG. 11 to FIG. 14. In the seatbelt devices 66, 68 according to the sixth exemplary embodiment and the seventh exemplary embodiment, members and portions corresponding to those of the seatbelt device 10 of the first exemplary embodiment will be appended with the same reference numerals as such corresponding members and portions of the seatbelt device 10 of the first exemplary embodiment, and explanation thereof will be omitted. Moreover, members and portions in the seatbelt device 68 according to the seventh exemplary embodiment corresponding to the seatbelt device 66 those of the sixth exemplary embodiment will be appended with the same reference numerals as such corresponding members and portions of the seatbelt device 66 of the sixth exemplary embodiment, and explanation thereof will be omitted.

Figure 11:
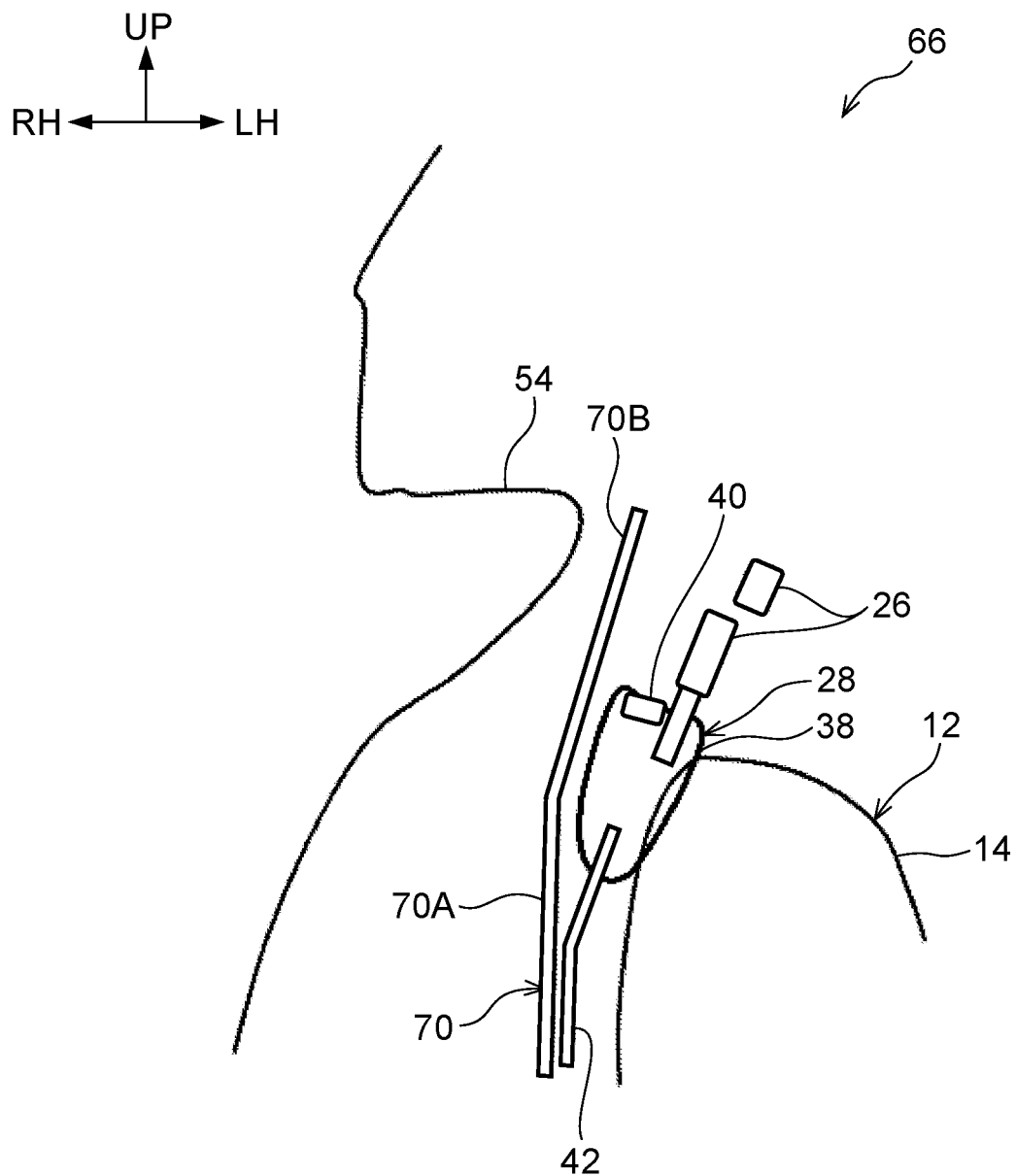
FIG. 11 is an enlarged face-on view illustrating an enlargement of a vicinity of a buckle of a seatbelt device of a sixth exemplary embodiment, illustrated in a state prior to a vehicle incurring a side impact.
Figure 12:
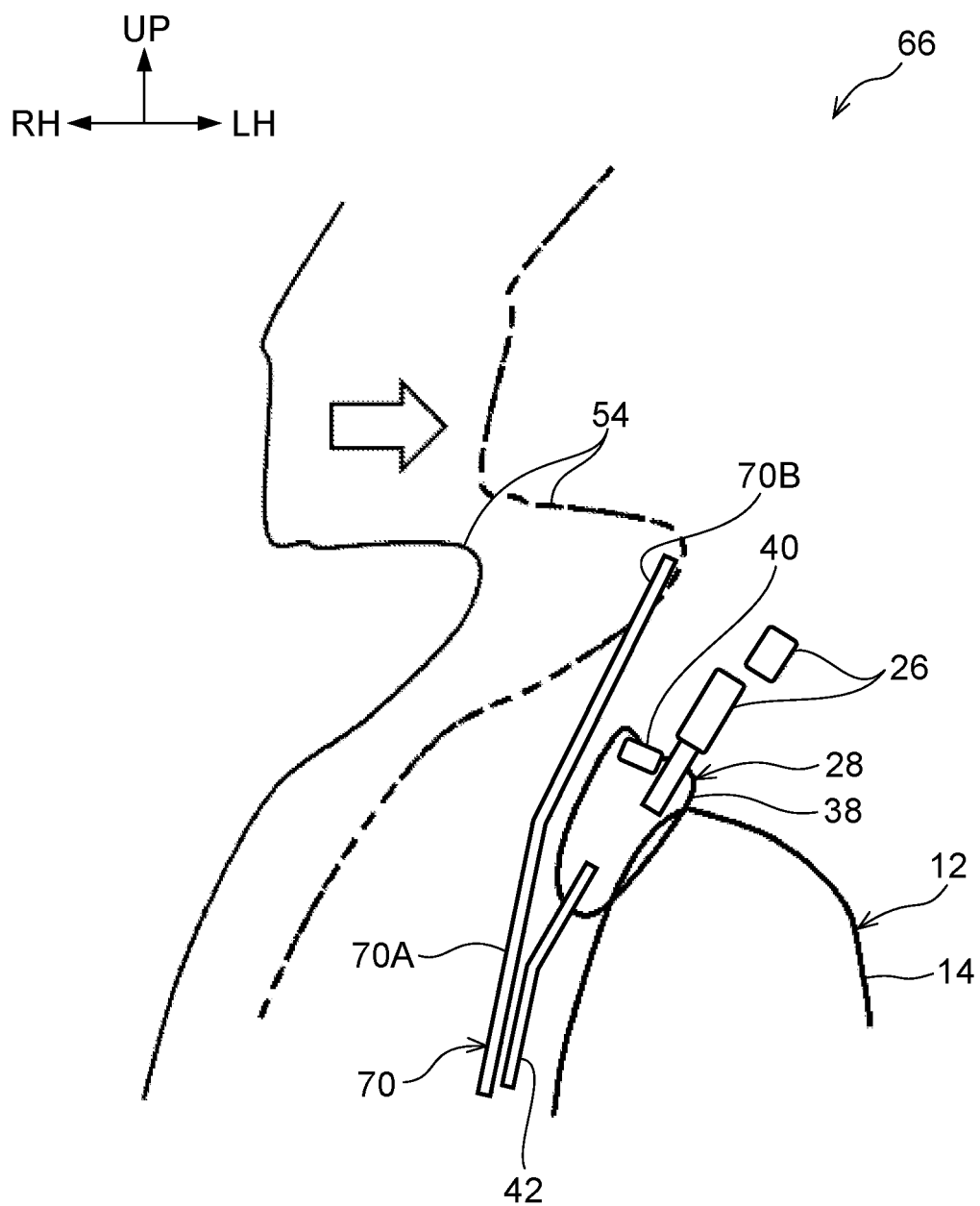
FIG. 12 is an enlarged face-on view illustrating an enlargement of a vicinity of a buckle of a seatbelt device of the sixth exemplary embodiment, illustrated in a state after a vehicle has incurred a side impact.

As illustrated in FIG. 11, in the seatbelt device 66 of the sixth exemplary embodiment, an operation space forming member 70 is provided at a seat width direction outer side with respect to the buckle 28. The operation space forming member 70 is formed in a plate shape having a thickness direction along the seat width direction, with an upper end portion 70B thereof slightly angled toward the seat width direction inner side with respect to a lower end portion 70A thereof. Moreover, the lower end portion 70A of the operation space forming member 70 is fixed to the connection member 42 through a non-illustrated fastening member. In a state in which the lower end portion 70A of the operation space forming member 70 is fixed to the connection member 42, the upper end portion 70B of the operation space forming member 70 extends further toward the upper side than the buckle 28.

In the seatbelt device 66 of the sixth exemplary embodiment as described above, as illustrated in FIG. 12, part of the side door 54 presses the operation space forming member 70 toward the buckle 28 side when the side door 54 has displaced toward the seat 12 side from the position illustrated by the solid line to the position indicated by the broken line in conjunction with a side impact of the vehicle. When the operation space forming member 70 is pressed toward the buckle 28 side, the operation space forming member 70 displaces toward the left side together with the buckle 28. Thus in the seatbelt device 66 of the sixth exemplary embodiment, a space enabling operation of the buckle 28 can be secured between the operation space forming member 70 and the buckle 28 when the operation space forming member 70 is displaced toward the left side together with the buckle 28. This thereby enables the occupant seated in the seat 12 to operate the buckle-side button 40 of the buckle 28 and to separate the tongue plate 26 from the buckle body 38 even after a side impact of the vehicle has occurred. The occupant seated in the seat 12 is accordingly able to remove the seatbelt 24. The seatbelt device 66 of the present exemplary embodiment accordingly enables the seatbelt 24 to be suppressed from becoming difficult to remove during a vehicle emergency, such as a side impact or the like.

Figure 13:
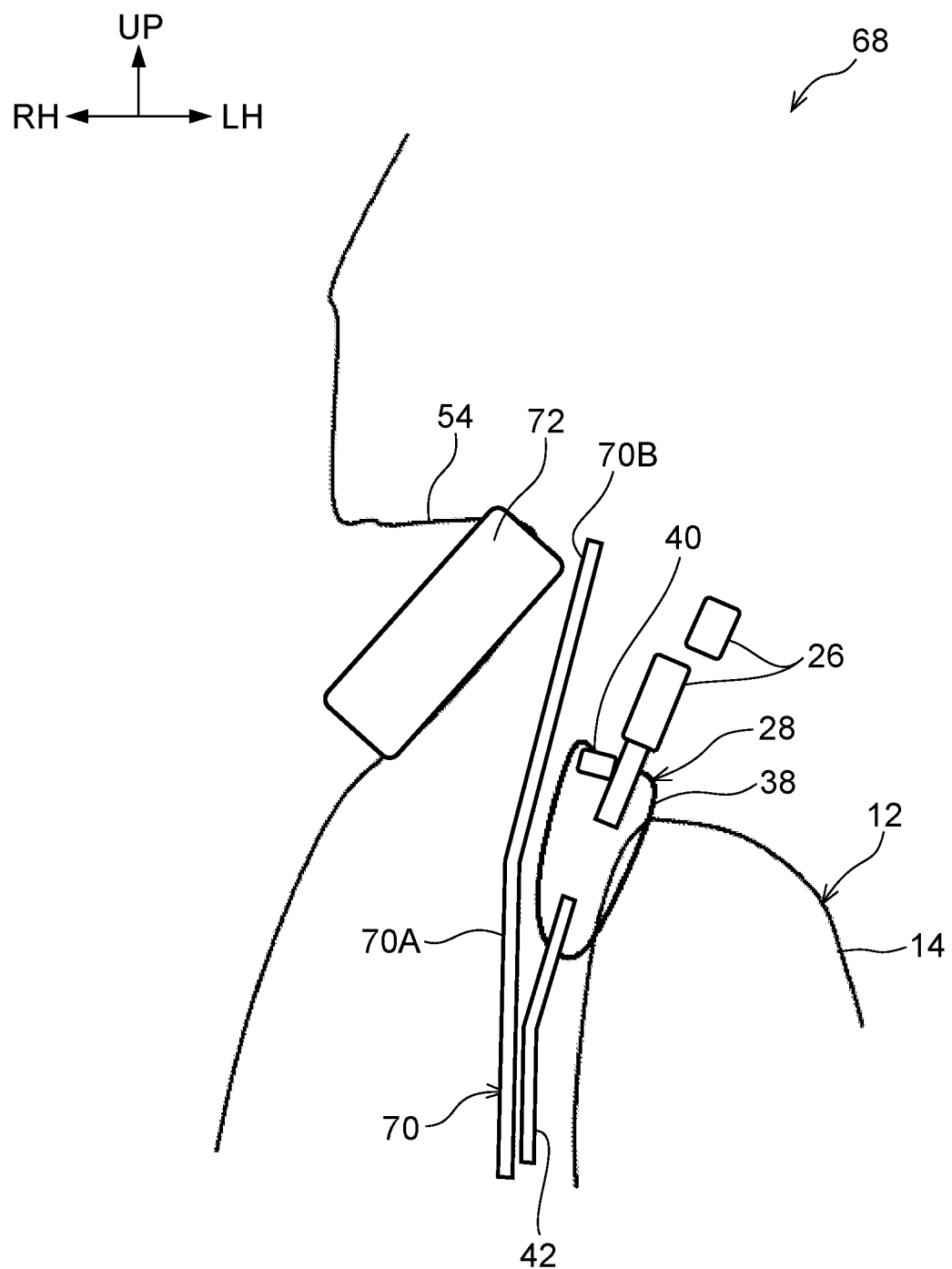
FIG. 13 is an enlarged face-on view illustrating an enlargement of a vicinity of a buckle of a seatbelt device of a seventh exemplary embodiment, illustrated in a state prior to a vehicle incurring a side impact.
Figure 14:
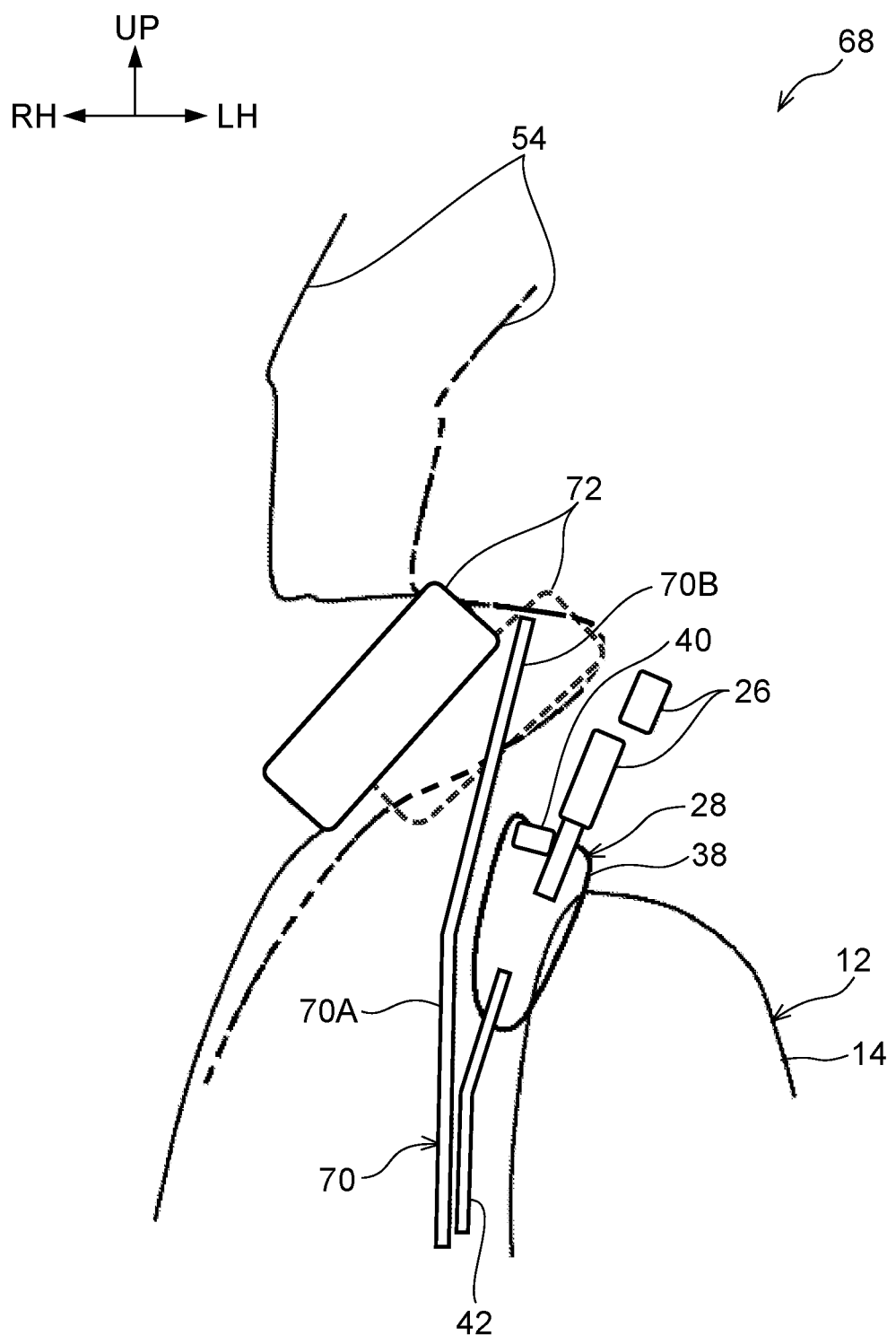
FIG. 14 is an enlarged face-on view illustrating an enlargement of a vicinity of a buckle of a seatbelt device of the seventh exemplary embodiment, illustrated in a state after a vehicle has incurred a side impact.

As illustrated in FIG. 13, the seatbelt device 68 of the seventh exemplary embodiment includes a deforming member 72 disposed at a seat width direction outer side with respect to the upper end portion 70B of the operation space forming member 70. The deforming member 72 is, as an example, a portion of an interior finishing material of the side door 54.

In the seatbelt device 68 of the seventh exemplary embodiment as described above, as illustrated in FIG. 14, part of the side door 54 presses the operation space forming member 70 toward the buckle 28 side when the side door 54 displaces toward the seat 12 side from the position illustrated by the solid line to the position indicated by the broken line in conjunction with a side impact of the vehicle. When the operation space forming member 70 is pressed toward the buckle 28 side, the operation space forming member 70 displaces together with the buckle 28 toward the left side. In the seatbelt device 68 of the seventh exemplary embodiment, the deforming member 72 deforms so as to collapse in the seat width direction when the part of the side door 54 presses the operation space forming member 70 toward the buckle 28 side. For example, the deforming member 72 deforms toward an opposite side from the operation space forming member 70. Displacement of the operation space forming member 70 toward the buckle 28 side can accordingly be suppressed by an amount commensurate with the amount of deformation of the deforming member 72.

Note that combinations may be made of the technical ideas of the present disclosure of the first exemplary embodiment to the seventh exemplary embodiment described above.

Although the present disclosure has been described using exemplary embodiments, the present disclosure is not limited to those described above, and obviously various modifications other than those described above may be implemented within a scope not departing from spirit of the present disclosure.

What is claimed is:

1. A seatbelt device, comprising:
a seatbelt formed in a belt shape;
a tongue plate through which the seatbelt has been inserted;
a buckle that is provided at one side in a seat width direction of a vehicle seat, with the tongue plate being attachably and detachably anchored to the buckle,
a rotation support section is provided between the vehicle seat and a floor of the vehicle to support the seat so as to be rotatable about an axial direction along a seat up-down direction, and the vehicle seat is able to be rotated between a state facing toward the front side and a state facing toward the rear side;
a belt-end anchor section that is provided at another side in the seat width direction of the vehicle seat, and that includes a separation operation portion, with an end portion of the seatbelt being anchored to the belt-end anchor section and the end portion of the seatbelt becoming separable as a result of an occupant of the vehicle operating the separation operation portion during a vehicle emergency; and
a pre-tensioner section configured to remove slack from the seatbelt by pulling the belt-end anchor section during a vehicle emergency, wherein:
the belt-end anchor section is disposed with the separation operation portion at a position inoperable by the occupant of the vehicle in a state prior to actuation of the pre-tensioner section, and
the belt-end anchor section is disposed with the separation operation portion at a position operable by the occupant of the vehicle in a state after actuation of the pre-tensioner section.

2. The seatbelt device of claim 1, further comprising a cover member that partitions a belt-end anchor section side from a side of the occupant seated in the vehicle seat and that includes an opening formed in a portion of the cover member, wherein:
the separation operation portion is covered by the cover member in a state prior to actuation of the pre-tensioner section, and
the separation operation portion is disposed at a position overlapping with the opening in a state after actuation of the pre-tensioner section.

3. The seatbelt device of claim 1, wherein:
the belt-end anchor section includes a belt-end anchor section body and the separation operation portion, which is supported by the belt-end anchor section body,
the belt-end anchor section body and the separation operation portion are configured with an identical color or common color series as each other in a normal state of the vehicle, and
at least a portion of the separation operation portion is illuminated during a vehicle emergency.

4. The seatbelt device of claim 1, wherein:
a buckle-side separation operation portion is provided at the buckle and enables separation of the tongue plate as a result of the buckle-side separation operation portion being operated by the occupant of the vehicle, and
an operation load on the separation operation portion needed to enable the end portion of the seatbelt to separate from the belt-end anchor section is higher than an operation load on the buckle-side separation operation portion needed to enable the tongue plate to separate from the buckle.

5. The seatbelt device of claim 1, wherein:
the belt-end anchor section includes a belt-end anchor section body and the separation operation portion, which is supported by the belt-end anchor section body,
the buckle includes a buckle body and a buckle-side separation operation portion that is supported by the buckle body, with the tongue plate being made separable from the buckle as a result of an occupant of the vehicle operating the buckle-side separation operation portion, and
a position of the separation operation portion with respect to the belt-end anchor section body is deeper inside the belt-end anchor section body than a position of the buckle-side separation operation portion with respect to the buckle body.

6. The seatbelt device of claim 1, wherein the separation operation portion is disposed in the seat width direction inner side with respect to an anchor member anchored to the belt-end anchor section.

7. The seatbelt device of claim 3, wherein the belt-end anchor section body is fixed to an end portion on the another side in the seat width direction of the vehicle seat through a connection member, the connection member is configured so as to be pulled toward the lower side by actuation of the pre-tensioner section, and wherein the belt-end anchor section and the separation operation portion, that are connected to the connection member, are pulled downward.

* * * * *